(12) United States Patent
Shibata et al.

(10) Patent No.: US 9,074,552 B2
(45) Date of Patent: Jul. 7, 2015

(54) FUEL INJECTOR CLOSING TIMING ADJUSTMENT SYSTEMS AND METHODS

(75) Inventors: Jonathan T. Shibata, Whitmore Lake, MI (US); Michael J. Lucido, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 459 days.

(21) Appl. No.: 13/590,599

(22) Filed: Aug. 21, 2012

(65) Prior Publication Data

US 2014/0000564 A1    Jan. 2, 2014

Related U.S. Application Data

(60) Provisional application No. 61/664,933, filed on Jun. 27, 2012.

(51) Int. Cl.
*F02M 51/06* (2006.01)
*F02D 41/30* (2006.01)
*F02D 41/40* (2006.01)
*F02D 41/20* (2006.01)
*F02D 41/14* (2006.01)

(52) U.S. Cl.
CPC .............. *F02D 41/401* (2013.01); *F02D 41/20* (2013.01); *F02D 41/40* (2013.01); *F02D 2041/2027* (2013.01); *F02D 2041/2051* (2013.01); *F02D 2041/2055* (2013.01); *Y02T 10/44* (2013.01)

(58) Field of Classification Search
CPC ....... F02D 41/20; F02D 41/40; F02D 41/401; F02D 2041/2027; F02D 2041/2051; F02D 2041/2052; F02D 2041/2055
USPC .......... 123/472, 490, 478, 480; 701/103, 105, 701/114
See application file for complete search history.

(56) References Cited

U.S. PATENT DOCUMENTS 4,478,193 A * 10/1984 Watanabe ................. 123/672
8,935,114 B2 * 1/2015 Beer et al. ................ 701/114
8,960,158 B2 * 2/2015 Beer ......................... 123/490

FOREIGN PATENT DOCUMENTS

EP    2455600 A1 *   5/2012 ............. F02D 41/20

* cited by examiner

*Primary Examiner* — Hieu T Vo

(57) ABSTRACT

A system for a vehicle includes a voltage measuring module, a second derivative module, a closing period module, and an injector driver module. The voltage measuring module measures first and second voltages at first and second electrical connectors of a fuel injector that injects fuel directly into a cylinder of an engine. The second derivative module determines a second-order derivative of a difference between the first and second voltages. The closing period module determines a closing period of the fuel injector based on the second-order derivative of the difference. The injector driver module selectively adjusts closing of the fuel injector based on the closing period.

20 Claims, 4 Drawing Sheets

US 9,074,552 B2

FUEL INJECTOR CLOSING TIMING ADJUSTMENT SYSTEMS AND METHODS

CROSS-REFERENCE TO RELATED APPLICATIONS

This application claims the benefit of U.S. Provisional Application No. 61/664,933, filed on Jun. 27, 2012. The disclosure of the above application is incorporated herein by reference in its entirety.

FIELD

The present application relates to internal combustion engines and more particularly to fuel injector control systems and methods for engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve and/or engine valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables determined based on the measured cylinder pressure, and/or one or more other suitable values.

SUMMARY

A system for a vehicle includes a voltage measuring module, a second derivative module, a closing period module, and an injector driver module. The voltage measuring module measures first and second voltages at first and second electrical connectors of a fuel injector that injects fuel directly into a cylinder of an engine. The second derivative module determines a second-order derivative of a difference between the first and second voltages. The closing period module determines a closing period of the fuel injector based on the second-order derivative of the difference. The injector driver module selectively adjusts closing of the fuel injector based on the closing period.

A method for a vehicle includes: measuring first and second voltages at first and second electrical connectors of a fuel injector that injects fuel directly into a cylinder of an engine; determining a second-order derivative of a difference between the first and second voltages; determining a closing period of the fuel injector based on the second-order derivative of the difference; and selectively adjusting closing of the fuel injector based on the closing period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts a mixture of air and fuel within cylinders to generate drive torque. A throttle valve regulates airflow into the engine. Fuel is injected by fuel injectors. Spark plugs may generate spark within the cylinders to initiate combustion. Intake and exhaust valves of a cylinder may be controlled to regulate flow into and out of the cylinder.

The fuel injectors receive fuel from a fuel rail. A high pressure fuel pump receives fuel from a low pressure fuel pump and pressurizes the fuel within the fuel rail. The low pressure fuel pump draws fuel from a fuel tank and provides fuel to the high pressure fuel pump. The fuel injectors inject fuel directly into the cylinders of the engine.

Different fuel injectors, however, may have different closing periods. The closing period of a fuel injector may refer to the period between: a first time when power is removed from the fuel injector to close the fuel injector and stop injecting fuel; and a second time when the fuel injector actually becomes closed and stops injecting fuel. Fuel injectors with longer closing periods may inject more fuel than fuel injectors with shorter closing periods.

The present application involves determining the closing period of a fuel injector based on a second derivative of a difference between voltages at first and second electrical conductors of the fuel injector. After power is removed from the electrical conductors of the fuel injector to close the fuel injector, the second derivative of the difference crosses a predetermined value when the fuel injector becomes closed and stops injecting fuel. For example, the second derivative of the difference may become greater than the predetermined value when the fuel injector stops injecting fuel.

The closing period of the fuel injector is therefore set based on a period between the time when power is removed from the fuel injector and the time when the second derivative crosses the predetermined value. A correction for the closing period of the fuel injector is determined based on the closing period of the fuel injector. The time when power is removed from the fuel injector is adjusted for future injection events based on the correction in order to offset a difference between the closing period of the fuel injector and a predetermined closing period.

Figure 1:
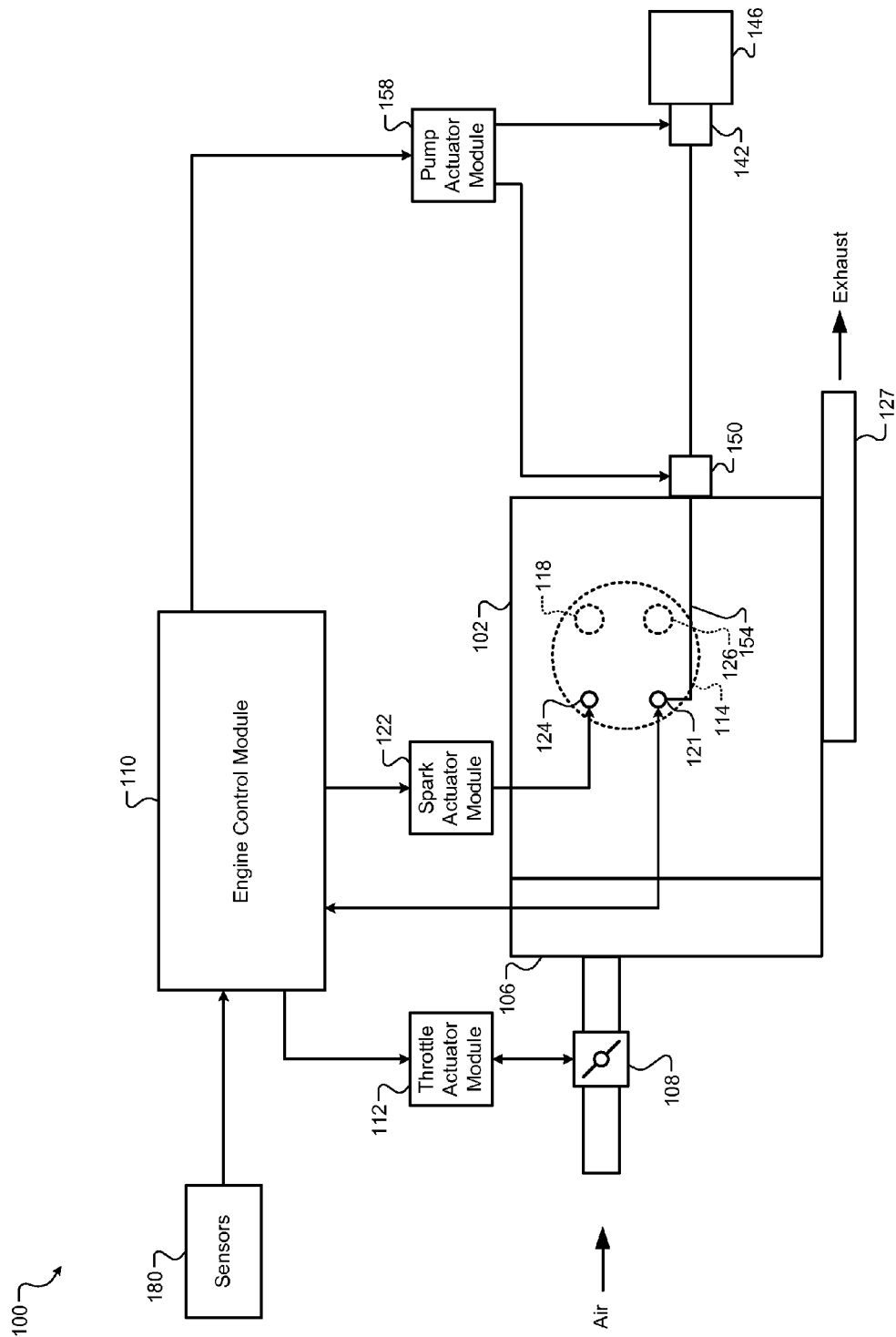
FIG. 1 is a functional block diagram of an example direct injection engine system according to the present disclosure.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another type of direct injection engine. One or more electric motors and/or motor generator units (MGUs) may be provided with the engine 102.

Air is drawn into an intake manifold 106 through a throttle valve 108. The throttle valve 108 may vary airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through an intake valve 118. One or more intake valves may be provided with each cylinder.

The ECM 110 controls fuel injection (e.g., amount and timing) into the cylinder 114 via a fuel injector 121. The fuel injector 121 injects fuel, such as gasoline, directly into the cylinder 114. The fuel injector 121 is a solenoid type, direct injection fuel injector. Solenoid type, direct injection fuel injectors are different than port fuel injection (PFI) injectors and piezo electric fuel injectors. The ECM 110 may control fuel injection to achieve a desired air/fuel ratio, such as a stoichiometric air/fuel ratio. A fuel injector is provided for each cylinder.

The injected fuel mixes with air and creates an air/fuel mixture in the cylinder 114. Based upon a signal from the ECM 110, a spark actuator module 122 may energize a spark plug 124 in the cylinder 114. A spark plug may be provided for each cylinder. Spark generated by the spark plug 124 ignites the air/fuel mixture.

The engine 102 may operate using a four-stroke cycle or another suitable operating cycle. The four strokes, described below, may be referred to as the intake stroke, the compression stroke, the combustion stroke, and the exhaust stroke. During each revolution of a crankshaft (not shown), two of the four strokes occur within the cylinder 114. Therefore, two revolutions crankshaft are necessary for the cylinders to experience all four of the strokes.

During the intake stroke, air from the intake manifold 106 is drawn into the cylinder 114 through the intake valve 118. Fuel injected by the fuel injector 121 mixes with air and creates an air/fuel mixture in the cylinder 114. One or more fuel injections may be performed during a combustion cycle. During the compression stroke, a piston (not shown) within the cylinder 114 compresses the air/fuel mixture. During the combustion stroke, combustion of the air/fuel mixture drives the piston, thereby driving the crankshaft. During the exhaust stroke, the byproducts of combustion are expelled through an exhaust valve 126 to an exhaust system 127.

A low pressure fuel pump 142 draws fuel from a fuel tank 146 and provides fuel at low pressures to a high pressure fuel pump 150. While only the fuel tank 146 is shown, more than one fuel tank 146 may be implemented. The high pressure fuel pump 150 further pressurizes the fuel within a fuel rail 154. The fuel injectors of the engine 102, including the fuel injector 121, receive fuel via the fuel rail 154. Low pressures provided by the low pressure fuel pump 142 are described relative to high pressures provided by the high pressure fuel pump 150.

The low pressure fuel pump 142 may be an electrically driven pump. The high pressure fuel pump 150 may be a variable output pump that is mechanically driven by the engine 102. A pump actuator module 158 may control operation (e.g., output) of the high pressure fuel pump 150. The pump actuator module 158 controls the high pressure fuel pump 150 based on signals from the ECM 110. The pump actuator module 158 may also control operation (e.g., ON/OFF state) of the low pressure fuel pump 142.

The engine system 100 may include one or more sensors 180. For example, the sensors 180 may include one or more fuel pressure sensors, a mass air flowrate (MAF) sensor, a manifold absolute pressure (MAP) sensor, an intake air temperature (IAT) sensor, a coolant temperature sensor, an oil temperature sensor, a crankshaft position sensor, and/or one or more other suitable sensors.

Figure 2:
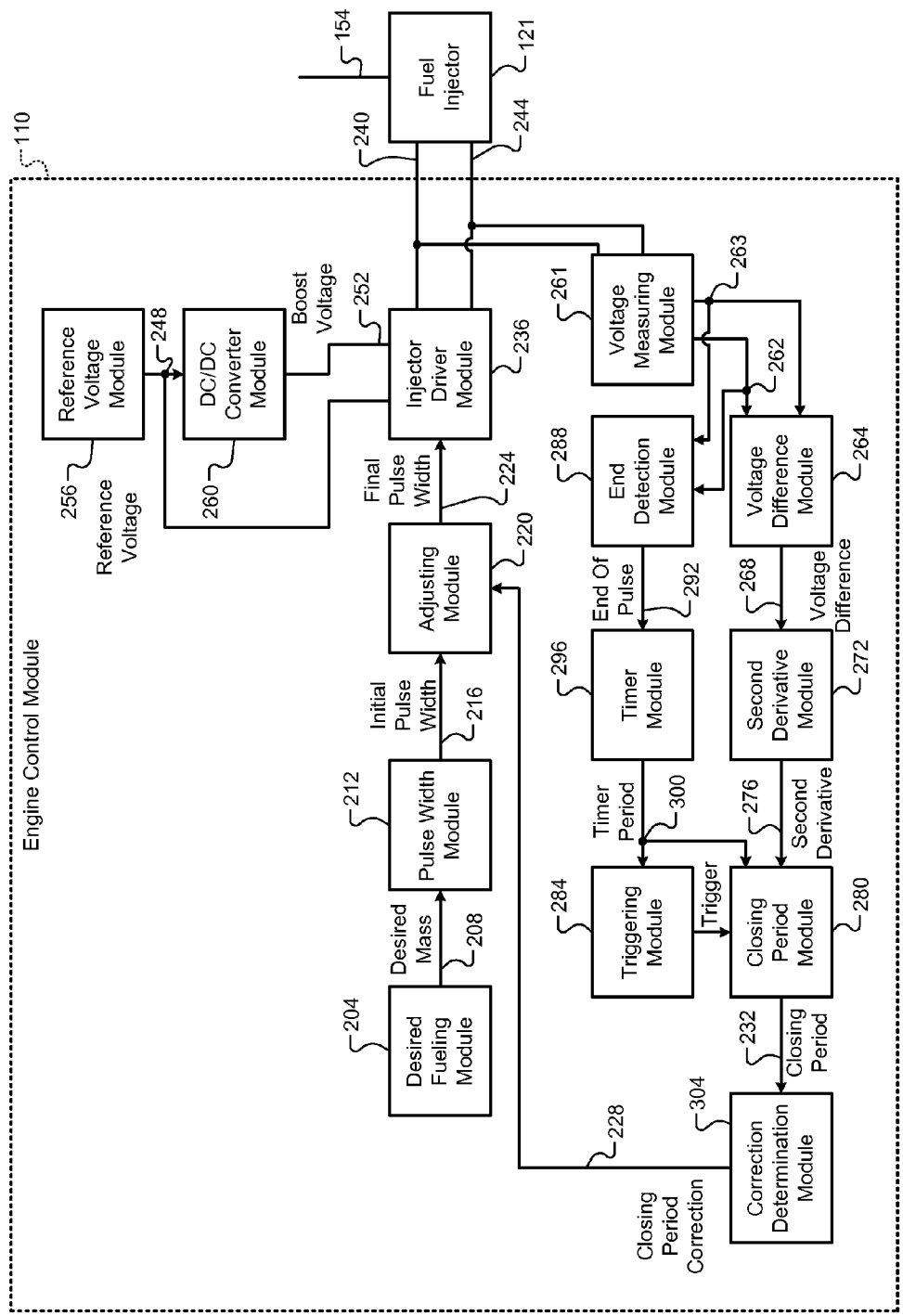
FIG. 2 is a functional block diagram of an example portion of an engine control module according to the present disclosure.

Referring now to FIG. 2, a functional block diagram of an example fuel injector control system including an example portion of the ECM 110 is presented. A desired fueling module 204 determines desired fuel injection parameters for a future fuel injection event of the fuel injector 121. For example, the desired fueling module 204 may determine a desired mass of fuel 208 for the fuel injection event and a desired starting timing (not shown) for the fuel injection event. The desired fueling module 204 may determine the desired mass of fuel 208, for example, based on a desired air/fuel ratio (e.g., stoichiometry) with an expected mass of air within the cylinder 114. The desired fueling module 204 may determine the desired mass of fuel 208, for example, further based on a flow rate of the fuel injector 121 and a density of the fuel. While only the desired mass of fuel 208 is shown and discussed, multiple fuel injection events may be performed during a combustion cycle of the cylinder 114.

A pulse width module 212 determines an initial (fuel injection) pulse width 216 for the fuel injection event based on the desired mass of fuel 208. The pulse width module 212 may determine the initial pulse width 216 further based on pressure of the fuel within the fuel rail 154 and/or one or more other parameters. The initial pulse width 216 corresponds to a period to hold the fuel injector 121 open during the fuel injection event to inject the desired mass of fuel 208 into the cylinder 114 under the operating conditions.

Different fuel injectors, however, may have different closing periods. The closing period of a fuel injector may refer to the period between: a first time when power is removed from the fuel injector to close the fuel injector and stop injecting fuel; and a second time when the fuel injector actually becomes closed and stops injecting fuel. Fuel injectors with longer closing periods will inject more fuel than fuel injectors with shorter closing periods despite all of the fuel injectors being controlled to inject the same amount of fuel.

An adjusting module 220 generates a final pulse width 224 based on a closing period correction 228 for the fuel injector 121 and the initial pulse width 216. More specifically, the adjusting module 220 adjusts (lengthens or shortens) the initial pulse width 216 based on the closing period correction 228 for the fuel injector 121. As discussed further below, the closing period correction 228 for the fuel injector 121 corresponds to a correction in pulse width necessary to offset a difference between a measured closing period 232 of the fuel injector 121 and a predetermined closing period.

The adjusting module 220 may, for example, set the final pulse width 224 equal to a sum of the initial pulse width 216 and the closing period correction 228 or equal to a product of the initial pulse width 216 and the closing period correction 228. In various implementations, the adjusting module 220 may set the final pulse width 224 using another suitable function or mapping that relates the initial pulse width 216 and the closing period correction 228 to the final pulse width 224.

An injector driver module 236 determines a desired current profile (not shown) based on the final pulse width 224. The injector driver module 236 applies high and low voltages to first and second electrical connectors of the fuel injector 121 via high and low side lines 240 and 244 to achieve the desired current profile through the fuel injector 121 during the fuel injection event.

The injector driver module 236 may generate the high and low voltages using reference and boost voltages 248 and 252. The reference and boost voltages 248 and 252 may be direct current (DC) voltages. A reference voltage module 256 provides the reference voltage 248, for example, based on a voltage of a battery (not shown) of the vehicle. A DC/DC converter module 260 boosts (increases) the reference voltage 248 to generate the boost voltage 252.

A voltage measuring module 261 measures the high voltage at the first electrical connector of the fuel injector 121 and generates a high side voltage 262 based on the voltage at the first electrical conductor. The voltage measuring module 261 also measures the low voltage at the second electrical connector of the fuel injector 121 and generates a low side voltage 263 based on the voltage at the second electrical conductor. The voltage measuring module 261 measures each of the high and low voltages relative to a ground potential.

A voltage difference module 264 generates a voltage difference 268 based on a difference between the low side voltage 263 and the high side voltage 262. For example, the voltage difference module 264 may set the voltage difference 268 equal to the low side voltage 263 minus the high side voltage 262. For another example, the voltage difference module 264 may set the voltage difference 268 equal to the high side voltage 262 minus the low side voltage 263. The voltage difference 268 may also be referred to as a voltage differential.

A second derivative module 272 generates a second derivative 276 based on the voltage difference 268. More specifically, the second derivative module 272 sets the second derivative 276 equal to a second order derivative of the voltage difference 268. In other words, the second derivative module 272 sets the second derivative 276 equal to the mathematical derivative of the mathematical derivative of the voltage difference 268. While the second derivative 276 of the voltage difference 268 is described, a second order derivative of the low side voltage 263 may be used.

When triggered by a triggering module 284, a closing period module 280 begins monitoring the second derivative 276. The closing period module 280 monitors the second derivative 276 to determine the closing period 232 as discussed further below. The triggering module 284 triggers the closing period module 280 a predetermined period after the injector driver module 236 removes power from the fuel injector 121 to close the fuel injector 121 for a fuel injection event.

An end detection module 288 generates an end of pulse signal 292 when the injector driver module 236 removes power from the fuel injector 121 to close the fuel injector 121.

For example, the end detection module 288 may monitor the high and low side voltages 262 and 263 and generate the end of pulse signal 292 when the high and low side voltages 262 and 263 cross a predetermined voltage, such as zero volts.

A timer module 296 resets a timer period 300 in response to the generation of the end of pulse signal 292. The timer module 296 resets the timer period 300 to a predetermined reset value, such as zero. The timer module 296 increments the timer period 300 as time passes after the generation of the end of pulse signal 292. In this manner, the timer period 300 tracks the period that has passed since the injector driver module 236 removed power from the fuel injector 121 to close the fuel injector 121.

The triggering module 284 triggers the closing period module 280 when the timer period 300 is greater than a predetermined period. While resetting the timer period 300 to zero, incrementing the timer period 300, and triggering the closing period module 280 when the timer period 300 is greater than the predetermined period have been discussed, another suitable scheme may be used. For example, resetting the timer period 300 based on the predetermined period, decrementing the timer period 300, and triggering the closing period module 280 when the timer period 300 is equal to zero may be used.

The closing period module 280 determines whether the fuel injector 121 is closed such that no fuel is being injected based on the second derivative 276. More specifically, the closing period module 280 may determine that the fuel injector 121 is closed when the second derivative 276 is greater than a predetermined value. For example, only, the predetermined value may be approximately zero, approximately 0.025, or another suitable value that the second derivative 276 will reach when the fuel injector 121 is fully closed. When the second derivative 276 is less than the predetermined value, the closing period module 280 may determine that the fuel injector 121 is not closed (i.e., at least partially open). This relationship may be applicable to situations where the voltage difference module 264 sets the voltage difference 268 equal to the low side voltage 263 minus the high side voltage 262. Another suitable relationship may be used if the voltage difference module 264 sets the voltage difference 268 equal to the high side voltage 262 minus the low side voltage 263 or sets the voltage difference equal to a magnitude of a difference between the low and high side voltages 263 and 262.

The closing period module 280 sets the closing period 232 equal to the timer period 300 in response to the determination that the fuel injector 121 is closed. A correction determination module 304 determines the closing period correction 228 based on the closing period 232 and the predetermined closing period. More specifically, the correction determination module 304 may determine the closing period correction 228 based on a difference between the closing period 232 and the predetermined closing period. The correction determination module 304 may determine the closing period correction 228, for example, using a function or a mapping that relates the difference between the closing period 232 and the predetermined closing period to the closing period correction 228. The predetermined closing period may be set, for example, based on an experimentally determined value for fuel injectors like the fuel injector 121.

Generally speaking, the correction determination module 304 may set the closing period correction 228 to shorten pulse widths (relative to the initial pulse widths) used for fuel injection events of the fuel injector 121 when the closing period 232 is greater than the predetermined closing period. When the closing period 232 is less than the predetermined closing period, the correction determination module 304 may set the closing period correction 228 to lengthen pulse widths used for fuel injection events. As the desired starting timing is used to begin fuel injection, the shortening or lengthening a pulse width causes the injector driver module 236 to remove power from the fuel injector 121 earlier or later than it would have in order to compensate for the closing period 232 of the fuel injector 121. A similar correction may be determined and applied for each fuel injector of the engine 102.

Figure 3:
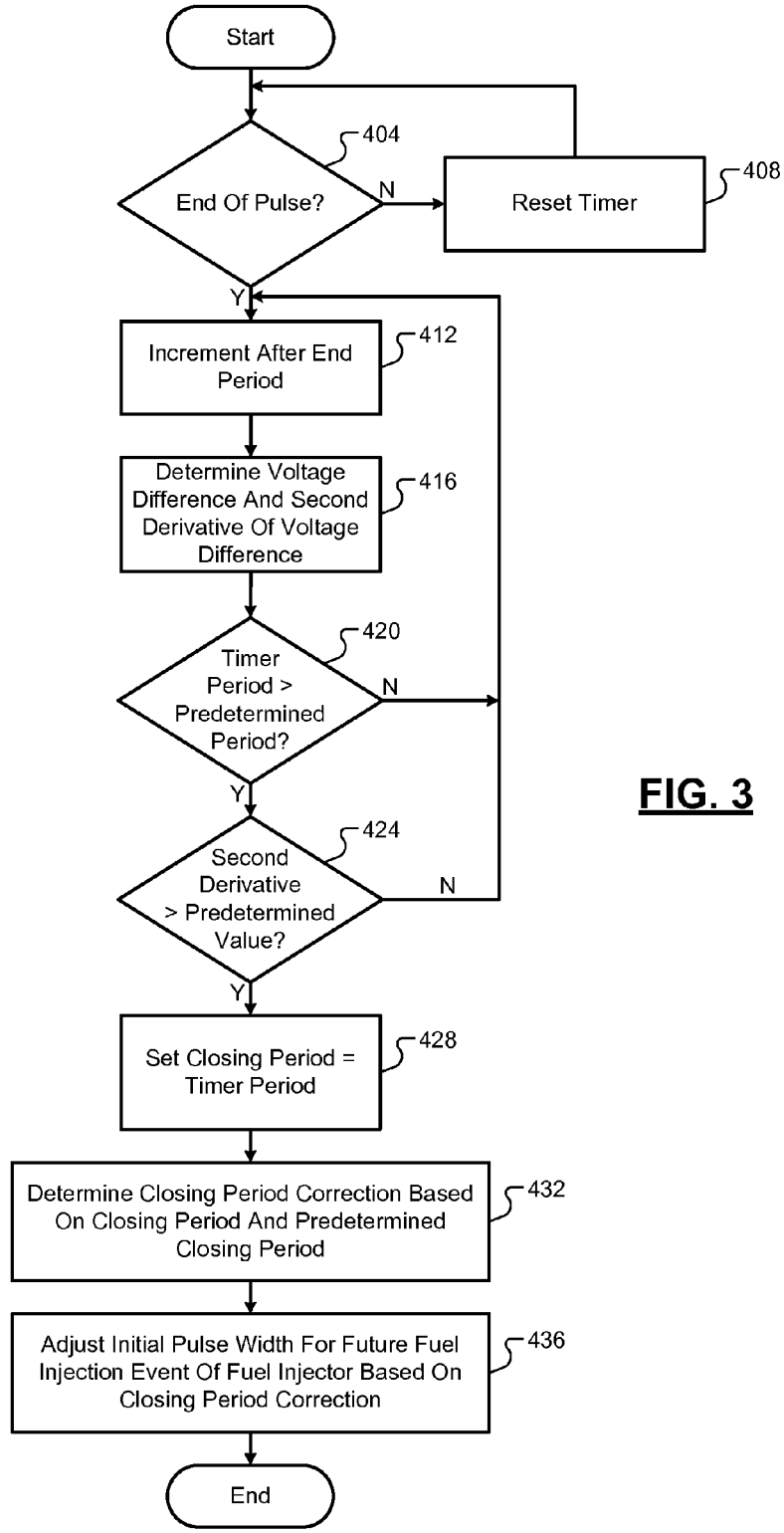
FIG. 3 is a flowchart depicting an example method of determining a closing period of a fuel injector based on the second derivative of the voltage difference and controlling closing of the fuel injector based on the closing timing according to the present disclosure.
Figure 4:
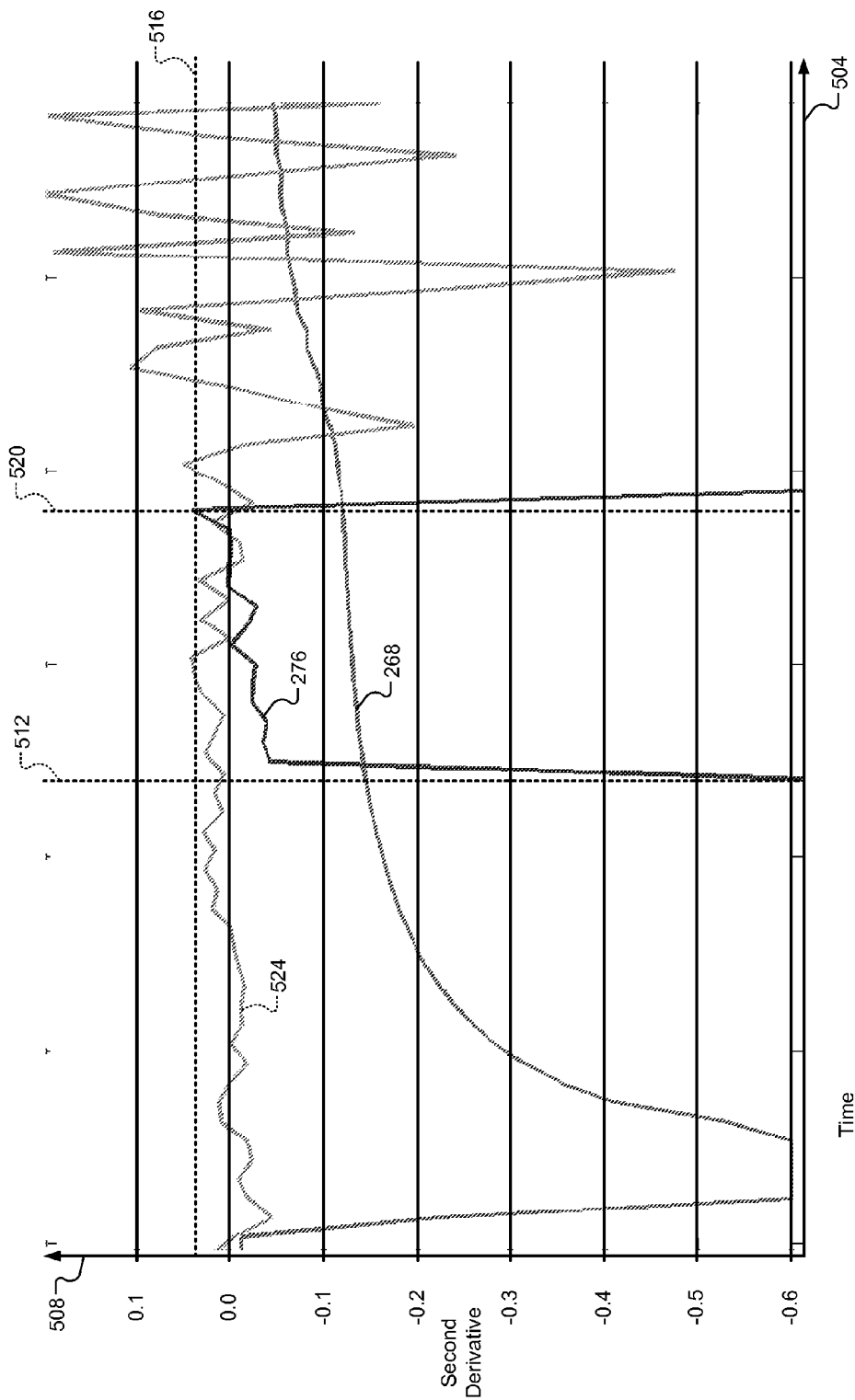
FIG. 4 is an example graph of voltage difference across connectors of a fuel injector and a second derivative of the voltage difference plotted as functions of time.

FIG. 3 is a flowchart depicting an example method of determining the closing period 232 of the fuel injector 121 based on the second derivative 276 of the voltage difference 268 and controlling closing of the fuel injector 121 based on the closing period 232. FIG. 4 includes an example graph of the second derivative 276 and the voltage difference 268 plotted as functions of time 504. Vertical axis 508 corresponds to the second derivative 276.

Referring now to FIGS. 3 and 4, control begins during a fuel injection event of the fuel injector 121. At 404, the end detection module 288 determines whether the injector driver module 236 has removed power from the fuel injector 121 to close the fuel injector 121. If false, the timer module 296 resets the timer period 300 at 408, and control returns to 404. If true, control continues with 412.

At 412, the timer module 296 increments the timer period 300. In this manner, the timer period 300 tracks the period between when the injector driver module 236 removed power from the fuel injector 121 to close the fuel injector 121 and the present time. At 416, the voltage difference module 264 determines the voltage difference 268, and the second derivative module 272 determines the second derivative 276. The voltage difference module 264 determines the voltage difference 268 based on a difference between the low side voltage 263 and the high side voltage 262. The second derivative module 272 determines the second derivative 276 based on the second derivative of the voltage difference 268.

At 420, the triggering module 284 determines whether the timer period 300 is greater than the predetermined period. If true, the triggering module 284 triggers the closing period module 280, and control continues with 424. If false, control returns to 412. In the example of FIG. 4, time 512 corresponds to the time when the triggering module 284 triggers the closing period module 280 (i.e., when the timer period 300 becomes greater than the predetermined period).

The closing period module 280 determines whether the second derivative 276 of the voltage difference 268 is greater than the predetermined value at 424. If not, control returns to 412. If true, control continues with 428. For example only, the predetermined value may be approximately 0.025 or another suitable value. In the example of FIG. 4, the predetermined value is represented by horizontal line 516. As illustrated in the example of FIG. 4, the second derivative 276 becomes greater than the predetermined value 516 at approximately time 520. Trace 524 tracks measurements of an injector accelerometer.

At 428, the closing period module 280 sets the closing period 232 equal to the timer period 300. In this manner, the closing period module 280 sets the closing period 232 equal to the period between the time when the injector driver module 236 removed power from the fuel injector 121 to close the fuel injector 121 and the time when the fuel injector 121 actually reached fully closed.

At 432, the correction determination module 304 determines the closing period correction 228 based on the closing period 232 and the predetermined closing period. For example, the correction determination module 304 may determine the closing period correction 228 based on a difference between the closing period 232 and the predetermined closing period. At 436, the adjusting module 220 adjusts the initial pulse width 216 determined for a future fuel injection event of the fuel injector 121 based on the closing period correction 228. In this manner, the final pulse width 224 and the power applied to the fuel injector 121 for the future fuel injection event will compensate for the difference between the closing period 232 of the fuel injector 121 and the predetermined closing period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
   a voltage measuring module that measures first and second voltages at first and second electrical connectors of a fuel injector that injects fuel directly into a cylinder of an engine;
   a second derivative module that determines a second-order derivative of a difference between the first and second voltages;
   a closing period module that determines a closing period of the fuel injector based on the second-order derivative of the difference; and
   an injector driver module that selectively adjusts closing of the fuel injector based on the closing period.

2. The system of claim 1 further comprising:
a correction determination module that determines a correction for the fuel injector based on the closing period;
a pulse width module that generates an initial pulse width for a future fuel injection event; and
an adjusting module that generates a final pulse width for the future fuel injection event by adjusting the initial pulse width based on the correction,
wherein the injector driver module applies power to the first and second electrical connectors of the fuel injector based on the final pulse width.

3. The system of claim 2 further comprising:
a timer module that tracks a period between a first time when the injector driver module removes power from first and second electrical connectors and a second time that is after the first time,
wherein, based on the second-order derivative, the closing period module selectively sets the closing period equal to the period.

4. The system of claim 3 wherein the closing period module sets the closing period equal to the period when the period is greater than a predetermined period and the second-order derivative crosses a predetermined value.

5. The system of claim 2 wherein the correction determination module determines the correction further based on a predetermined closing period.

6. The system of claim 5 wherein the correction determination module determines the correction based on a difference between the closing period and the predetermined closing period.

7. The system of claim 2 wherein the adjusting module sets the final pulse width for the future fuel injection event equal to a sum of the initial pulse width and the correction.

8. The system of claim 2 wherein the adjusting module sets the final pulse width for the future fuel injection event equal to a product of the initial pulse width and the correction.

9. The system of claim 2 further comprising a desired fueling module that generates a desired mass of fuel for the future fuel injection event,
wherein the pulse width module determines the initial pulse width based on the desired mass.

10. The system of claim 2 wherein the injector driver module determines a desired current profile for the future fuel injection event based on the final pulse width and applies power to the first and second electrical connectors of the fuel injector based on the desired current profile.

11. A method for a vehicle, comprising:
measuring first and second voltages at first and second electrical connectors of a fuel injector that injects fuel directly into a cylinder of an engine;
determining a second-order derivative of a difference between the first and second voltages;
determining a closing period of the fuel injector based on the second-order derivative of the difference; and
selectively adjusting closing of the fuel injector based on the closing period.

12. The method of claim 11 further comprising:
determining a correction for the fuel injector based on the closing period;
generating an initial pulse width for a future fuel injection event;
generating a final pulse width for the future fuel injection event by adjusting the initial pulse width based on the correction; and
applying power to the first and second electrical connectors of the fuel injector based on the final pulse width.

13. The method of claim 12 further comprising:
tracking a period between a first time when power is removed from first and second electrical connectors and a second time that is after the first time; and,
based on the second-order derivative, selectively setting the closing period equal to the period.

14. The method of claim 13 further comprising setting the closing period equal to the period when the period is greater than a predetermined period and the second-order derivative crosses a predetermined value.

15. The method of claim 12 further comprising determining the correction further based on a predetermined closing period.

16. The method of claim 15 further comprising determining the correction based on a difference between the closing period and the predetermined closing period.

17. The method of claim 12 further comprising setting the final pulse width for the future fuel injection event equal to a sum of the initial pulse width and the correction.

18. The method of claim 12 further comprising setting the final pulse width for the future fuel injection event equal to a product of the initial pulse width and the correction.

19. The method of claim 12 further comprising:
generating a desired mass of fuel for the future fuel injection event; and
determining the initial pulse width based on the desired mass.

20. The method of claim 12 further comprising:
determining a desired current profile for the future fuel injection event based on the final pulse width; and
applying power to the first and second electrical connectors of the fuel injector based on the desired current profile.

* * * * *